US008655652B2

(12) United States Patent
Schug

(10) Patent No.: US 8,655,652 B2
(45) Date of Patent: Feb. 18, 2014

(54) APPARATUS AND METHOD FOR ENCODING AN INFORMATION SIGNAL

(75) Inventor: Michael Schug, Erlangen (DE)

(73) Assignee: Dolby International AB, Amsterdam Zuid-Oost (NL)

( * ) Notice: Subject to any disclaimer, the term of this patent is extended or adjusted under 35 U.S.C. 154(b) by 539 days.

(21) Appl. No.: 12/446,164

(22) PCT Filed: Sep. 25, 2007

(86) PCT No.: PCT/EP2007/008332

§ 371 (c)(1), (2), (4) Date: Nov. 4, 2010

(87) PCT Pub. No.: WO2008/046492

PCT Pub. Date: Apr. 24, 2008

(65) Prior Publication Data

US 2011/0051800 A1 Mar. 3, 2011

Related U.S. Application Data

(60) Provisional application No. 60/862,412, filed on Oct. 20, 2006.

(51) Int. Cl.

| | |
|---|---|
| ***G10L 19/00*** | (2006.01) |
| ***G10L 19/14*** | (2006.01) |
| ***G10L 19/02*** | (2006.01) |
| ***H04N 11/04*** | (2006.01) |

(52) U.S. Cl.

USPC ....... 704/230; 704/224; 704/229; 375/240.03

(58) Field of Classification Search

None

See application file for complete search history.

(56) References Cited

U.S. PATENT DOCUMENTS

| | | | | |
|---|---|---|---|---|
| 5,675,385 A | | 10/1997 | Sugiyama | |
| 5,946,652 A | * | 8/1999 | Heddle | 704/230 |
| 6,246,345 B1 | * | 6/2001 | Davidson et al. | 341/51 |
| 6,292,126 B1 | * | 9/2001 | Chelehmal et al. | 341/155 |
| 6,351,226 B1 | * | 2/2002 | Saunders et al. | 341/50 |

(Continued)

FOREIGN PATENT DOCUMENTS

| | | |
|---|---|---|
| DE | 3328111 | 2/1985 |
| EP | 1379090 | 1/2004 |
| WO | WO-2005083681 | 9/2005 |

OTHER PUBLICATIONS

Huffman, D.A.; , "A Method for the Construction of Minimum-Redundancy Codes," Proceedings of the IRE , vol. 40, No. 9, pp. 1098-1101, Sep. 1952.*

*Primary Examiner* — Brian Albertalli

(74) *Attorney, Agent, or Firm* — Michael A. Glenn; Perkins Coie LLP

(57) ABSTRACT

An apparatus for encoding an information signal having discrete values includes a quantizer having a quantizer border, wherein the quantizer is adapted so that a discrete value above the quantization border is quantized to a quantization index, which is different from a quantization index obtained by quantizing a discrete value below the quantization border, a controller for modifying the quantization border, wherein the quantizer having a first quantization border setting is adapted to generate a first set of quantization indices for the discrete values, and wherein the quantizer having a second modified quantization border setting is adapted to generate a second set of quantization indices, and an output interface for outputting an encoded information signal which is either based on the first set of quantization indices or the second set of quantization indices dependent on a decision function.

17 Claims, 7 Drawing Sheets

(56) References Cited

U.S. PATENT DOCUMENTS

| | | | | |
|---|---|---|---|---|
| 6,604,069 | B1 * | 8/2003 | Tsutsui | 704/200.1 |
| 7,464,027 | B2 * | 12/2008 | Schuller et al. | 704/200.1 |
| 7,613,603 | B2 * | 11/2009 | Yamashita | 704/200.1 |
| 7,756,705 | B2 * | 7/2010 | Lee | 704/230 |
| 2005/0254719 | A1 * | 11/2005 | Sullivan | 382/251 |
| 2006/0074693 | A1 | 4/2006 | Yamashita | |
| 2007/0147497 | A1 * | 6/2007 | Bao et al. | 375/240.03 |

* cited by examiner

Quantization with fine quantizer step size

Quantization with coarse quantizer step size

Quantization with fine quantizer step size and modified quantizing border

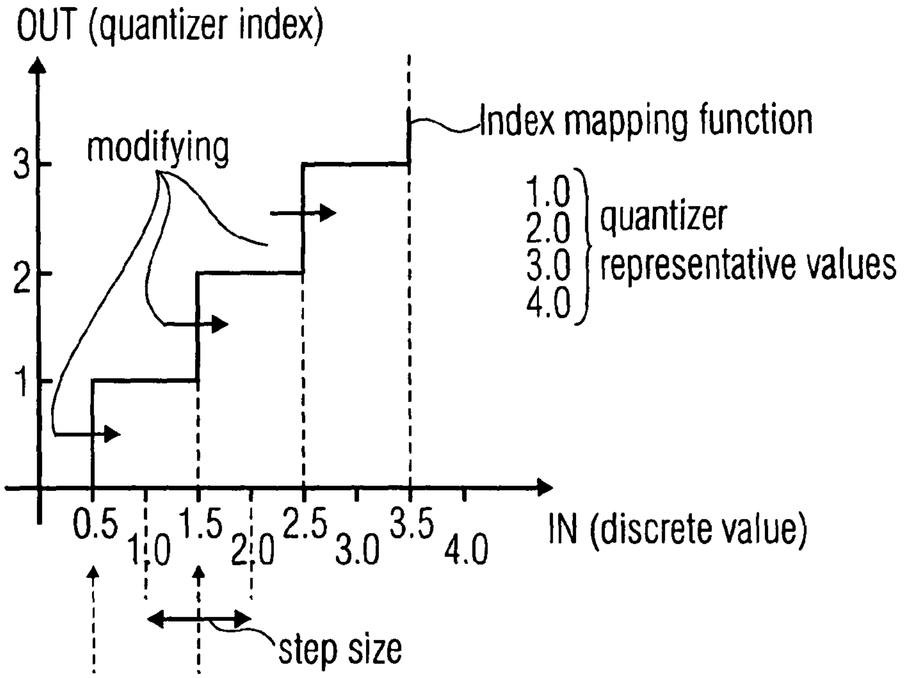

- Quantization border at 0.5, 1.5,...
  0≤IN <0.5: OUT = 0 (quantization index)
  0.5≤IN ≤1.5: OUT = 1 (quantization index)

- Quantization step size determines / accurecy error
  e.g. $IN_2$ =2.0, $IN_1$ =1.0 → step size = 1.0

→ Increase accuracy by modifying descrete value before quantization using scalefactor >1
≙ reducing quantization step size → decrease accuracy by modifying descrete value before quantization using scale factor <1
≙ increasing quantization step size

FIG 10

APPARATUS AND METHOD FOR ENCODING AN INFORMATION SIGNAL

CROSS-REFERENCE TO RELATED APPLICATIONS

This application is a U.S. national entry of PCT Patent Application Ser. No. PCT/EP2007/008332 filed 25 Sep. 2007, and claims priority to U.S. provisional patent application No. 60/862,412 filed on Oct. 20, 2006, which is incorporated herein by reference in its entirety.

The present invention relates to the encoding of information signals and particularly to a specific quantization implementation.

BACKGROUND OF THE INVENTION

Modern audio coding methods such as e.g. MPEG Layer 3, MPEG AAC or MPEG HE-AAC are capable of reducing the data rate of digital audio signals by means of exploiting psycho-acoustical properties of the human ear. Hereby a block of a fixed number of audio samples, called frame, is transformed in the frequency domain. Adjacent frequency coefficients are grouped together into scalefactor bands. The coefficients of each scalefactor band are quantized and the quantized coefficients are entropy coded into a compressed bitstream representation of this frame. The quantization step size is controllable for each individual scalefactor band. It has to be chosen such that on the one hand the resulting quantization noise is smaller than a threshold given by the perceptual model of the encoder, but on the other hand that the number of bits necessitated for encoding this scalefactor band is as small as possible. These are two contrary conditions: Reducing the quantization noise is normally accomplished by decreasing the quantization step size of the quantizer, resulting in larger quantized values. Entropy coding schemes as e.g. Huffman coding for MPEG Layer 3 or MPEG AAC of the quantized values are usually designed to spend less bits on the smaller values because of the greater occurrence of small quantized values. Since the spectral coefficients are signed, all quantized coefficients except for the quantization index 0 need one bit in addition to store the sign.

Quantizers in conventional methods are usually designed in such a way that the resulting quantization error will be minimized. However it is not considered that the bit demand for different quantized values is not equal.

SUMMARY

According to an embodiment, an apparatus for encoding an information signal having discrete values may have: a quantizer having a quantizer step size and a quantization border between two quantizer representative values, a distance between the two quantizer representative values being the quantizer step size, wherein the quantizer is adapted so that a discrete value above the quantization border is quantized to a quantization index, which is different from a quantization index obtained by quantizing a discrete value below the quantization border; a controller for modifying the quantization border between the two quantizer representative values to obtain a modified quantization border setting, wherein the quantizer having a first quantization border setting is adapted to generate a first set of quantization indices for the discrete values, and wherein the quantizer having a second modified quantization border setting is adapted to generate a second set of quantization indices, wherein the controller is operative to modify the quantization border so that the second set of quantization indices represents a signal after dequantization having an energy being closer to the energy of the original signal by a predetermined deviation threshold; and an output interface for outputting an encoded information signal which is either based on the first set of quantization indices or the second set of quantization indices dependent on a decision function.

According to another embodiment, a method of encoding an information signal having discrete values, using a quantizer having a quantizer step size and a quantization border between two quantizer representative values, a distance between the two quantizer representative values being the quantizer step size, wherein the quantizer is adapted so that a discrete value above the quantization border is quantized to a quantization index, which is different from a quantization index obtained by quantizing a discrete value below the quantization border, may have the steps of: modifying the quantization border between the two quantizer representative values to obtain a modified quantization border setting; generating, using the quantizer having a first quantization border setting, a first set of quantization indices for the discrete values, or, using the quantizer having a second modified quantization border setting, a second set of quantization indices, wherein the quantization border is modified so that the second set of quantization indices represents a signal after dequantization having an energy being closer to the energy of the original signal by a predetermined deviation threshold; deciding, using a decision function, whether an encoded information signal is either based on the first set of quantization indices or the second set of quantization indices; and outputting the encoded information signal.

Another embodiment may have a computer program for performing, when running on a computer, the method of encoding an information signal.

BRIEF DESCRIPTION OF THE DRAWINGS

Embodiments of the present invention will be detailed subsequently referring to the appended drawings, in which:

FIG. 10 is a detailed diagram for illustrating the functionality of the quantizer of FIG. 9.

DETAILED DESCRIPTION OF THE INVENTION

Figure 1:
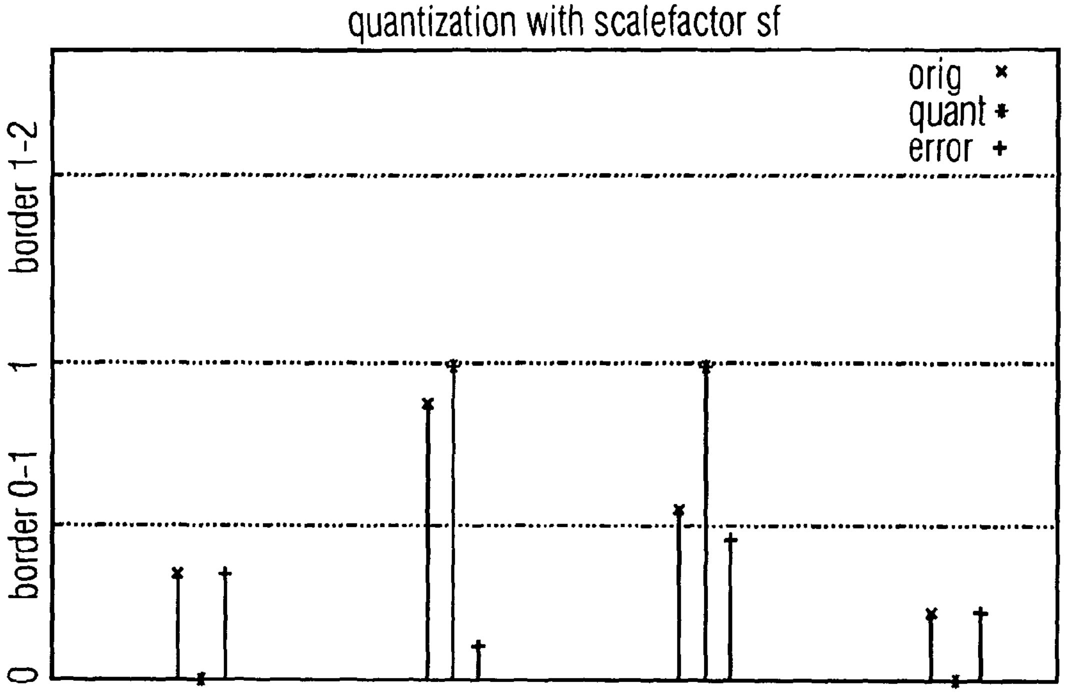
FIG. 1 is the normal quantization of spectral coefficients with a fine quantizer step size.

The present invention relates to the problem that quantization of spectral coefficients does not take into account the subsequent entropy coding of the quantized values. By a modification of the normal quantization method, embodiments of the invention address this problem. A detection algorithm is made operative to decide for each scalefactor band whether it is advantageous to use the favored quantization method over the normal one.

Embodiments of the inventive quantization of spectral data with subsequent entropy coding comprise the following steps:

At an encoder, the quantizer is modified by moving the border between two quantizer representatives, thereby abandoning the principle of quantization with minimum mean squared error;

in addition to the existing quantization methods a different quantized representation of a group of spectral coefficients is created;

considering the quantization distortion and the number of bits needed after entropy coding of the new quantized representation over the normal quantization possibilities, since the new quantized representation may be advantageous.

Further embodiments relate to an apparatus for quantization spectral coefficients of a transform based audio coder comprising:

modifying the borders between two quantized values representatives; and modifying the borders in such a way that the probability for an output of quantized values which necessitate fewer bits in a subsequent entropy coding stage is increased.

Further embodiments include a detection mechanism having the following features individually or in any combination:

deciding whether to use normal quantization or quantization according to the present invention;

deciding by choosing the solution with smallest quantization noise;

optional considering the resulting quantized energy;

optional considering the tonality of the respective spectral region;

optional considering the spectral flatness of the respective spectral region; or optional considering the stationarity of the signal.

The quantization is performed in a perceptual audio encoder. Embodiments, when implemented in an audio coding scheme, take advantage of the fact that the quantized spectral data of the audio coding scheme is entropy coded with code words of variable length such as e.g. Huffman coding in MPEG AAC. The quantization method can be used in combination to the normal quantization thus enlarging the amount of different quantization possibilities. A detection algorithm considering among other criteria the resulting quantization noise can choose the best method from the increased amount of possibilities. The embodiment is applicable for all audio coding systems where entropy coding of the quantized spectral values is performed, i.e. for all systems where different quantized values are coded using codewords of different length.

The invention adds new possibilities for the quantization of scalefactor bands that in some cases are advantageous compared to the normal quantization procedure. A quantizer for an audio coding scheme is usually designed in such a way that for a given quantizer step size the resulting quantization error is minimized. Quantizing means, all values in a given interval $[b_{n-1,n}, b_{n,n+1}]$ are assigned to the quantization index n with the representative value of $q_n$. For minimal quantization error the border $b_{n,n+1}$ between representative $q_n$ and the next representative $q_{n+1}$ is chosen to be in the middle of both values: $b_{n,n+1}=(q_n+q_{n+1})/2$. Then the maximum possible difference between representative and real value is $b_{n,n+1}-q_n$ which is the same as $q_{n+1}-b_{n,n+1}$.

The present invention deviates from this approach of minimal quantization error by considering in addition the number of bits needed to store the quantization result. Increasing the quantization borders $b_{n,n+1}$ towards the larger representative, will yield in some cases in a smaller quantization index with the consequence of an increasing quantization error. This quantization of the scalefactor band uses fewer bits than before at the cost of a higher distortion (lower SNR). The new possibility can be advantageous compared to the normal quantization method with a coarser quantization step size. Depending on the spectral coefficients to be quantized, there will be cases where the resulting quantization error is still smaller compared to the normal quantization with coarser quantizer step size, while the amount of bits is equal for both methods.

Figure 2:
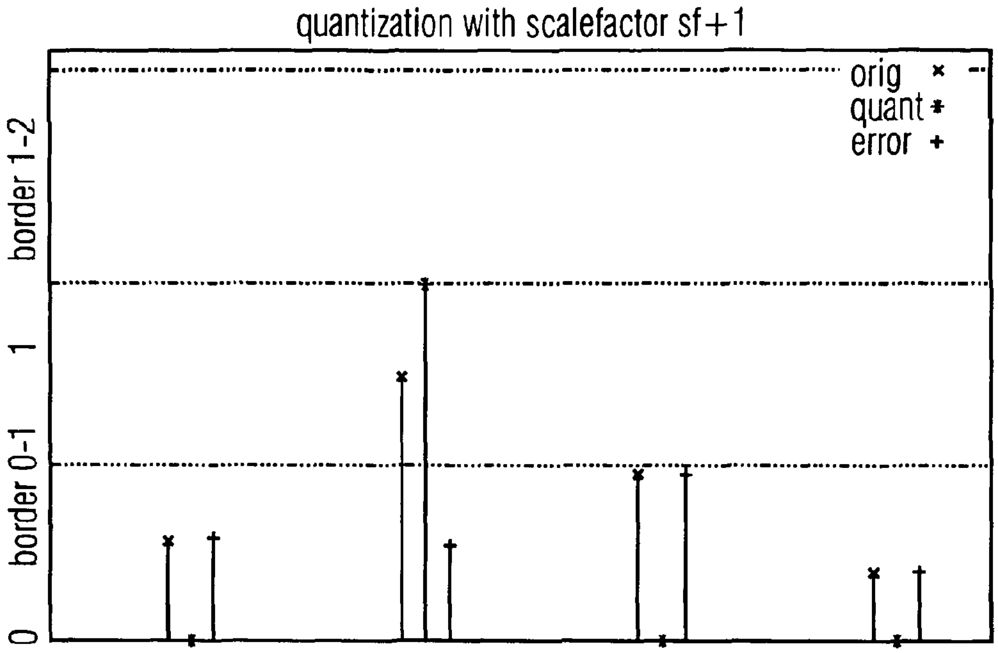
FIG. 2 is the normal quantization of the same spectral coefficients as in FIG. 1 with a coarse quantizer step size.

In FIG. 1 there is an example for normal quantization of a scalefactor band. It shows four spectral coefficients, the resulting quantized value after inverse quantization by the decoder and the error as difference between original and quantized value. Two of the four coefficients are quantized to 1 giving the sequence 0-1-1-0 for the quantized values. In FIG. 2 the same scalefactor band is quantized with a coarser quantization step size. Now the sequence of quantized values is 0-1-0-0. When using the Spectrum Huffman Codebook 2 of MPEG AAC, 6 bits are needed to encode the sequence of quantized values of FIG. 1, whereas for the coarser quantization of FIG. 2 only 5 bits are necessitated. But still the quantization noise in FIG. 1 is smaller resulting in an SNR of 5.3 dB compared to the 3.5 dB SNR in the example shown in FIG. 2.

Figure 3:
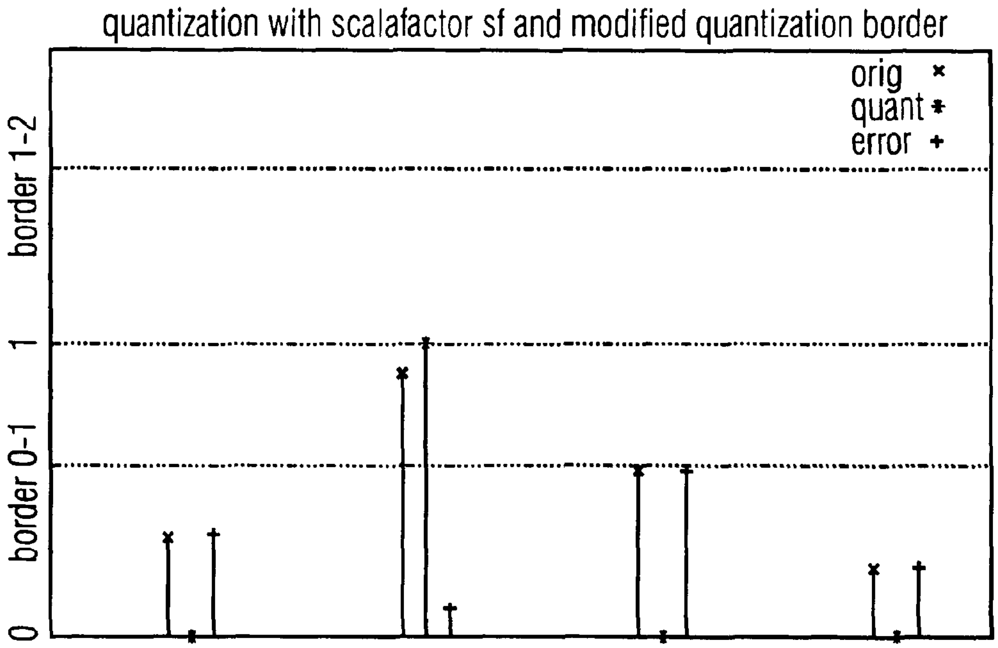
FIG. 3 is the quantization according to the present invention of the same spectral coefficients as in FIG. 1.

In FIG. 3 the quantization method according to the present invention is illustrated for the example already used in FIGS. 1 and 2. Here the same quantization step size as in FIG. 1 has been used, but the border that separates quantization index 0 and 1 has been moved up to the same value as in the example of FIG. 2 with the coarser quantization. In this example of the new quantization method, the quantization index sequence is now 0-1-0-0 as in FIG. 2 which translates again into 5 bits used according to Spectrum Huffman Codebook 2 of MPEG 2. But due to the fact that the representative for quantization index 1 is closer to the original spectral coefficient, the overall quantization distortion results in an SNR value of 4.2 dB which is better than what can be achieved at the same amount of bits with normal quantization as shown in the example of FIG. 2. Then a detection algorithm can choose between normal quantization and the modified quantization according to the invention.

Figure 4:
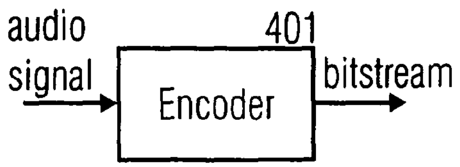
FIG. 4 is a typical encoder.
Figure 5:
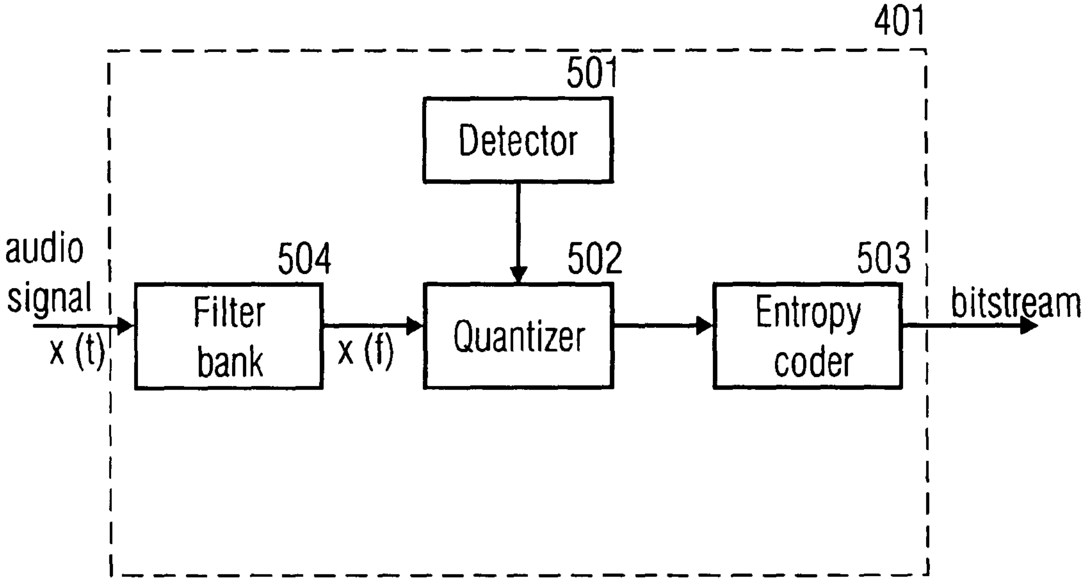
FIG. 5 is according to the invention a more detailed view of the encoder.

In FIG. 4 a typical encoder 401 is presented. In FIG. 5 a more detailed view of the encoder 401 is given. An audio signal is input to the filterbank 504 and transformed into the frequency domain, and then the signal is input to the quantizer 502 and the detector 501. The quantized signal is input to the entropy coder 503. The detector 501 decides out of the input from the entropy coder and from the input of the audio signal whether there need to be less bits and which quantization method that is to be used.

Figure 8:
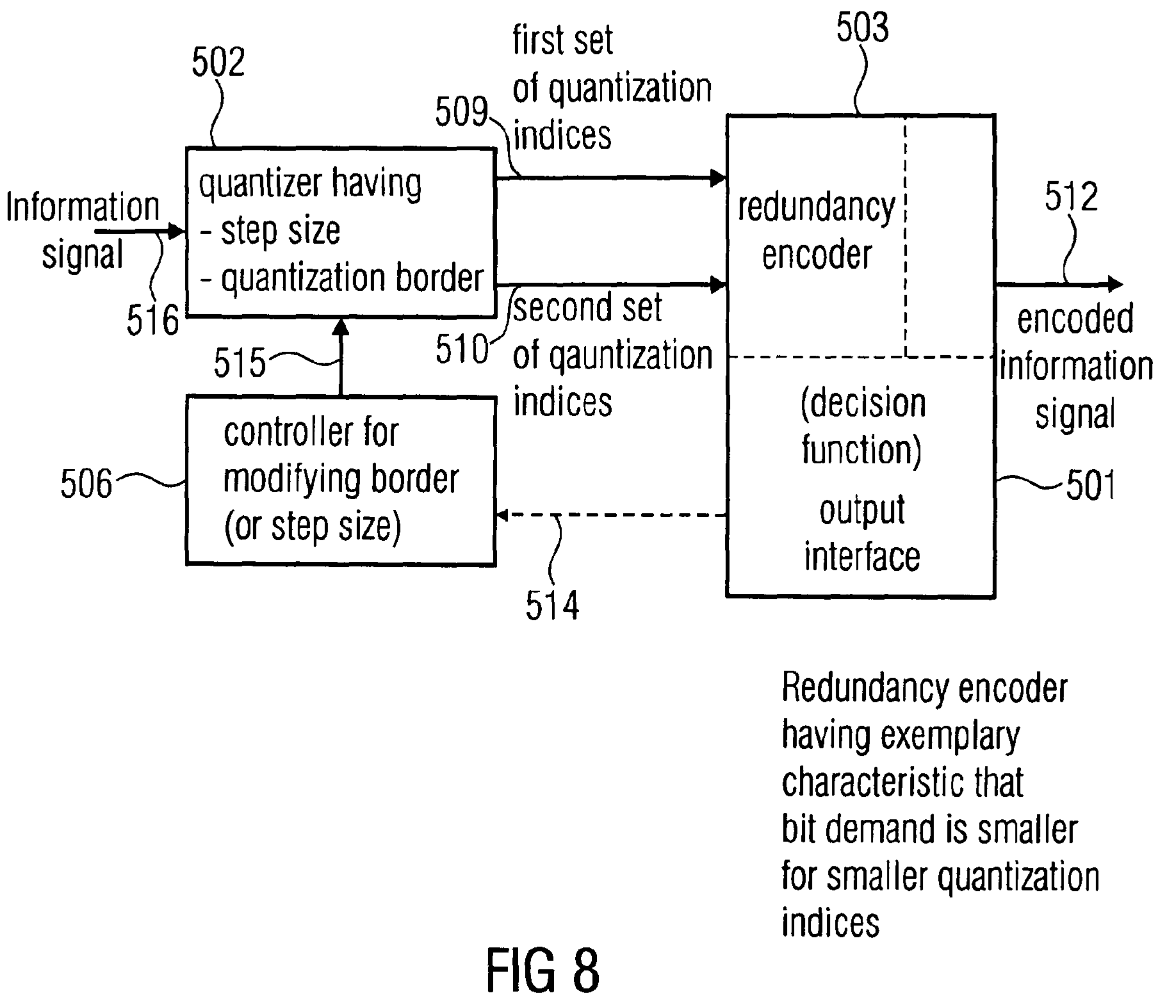
FIG. 8 is an apparatus for encoding an information signal in accordance with a further embodiment of the present invention.

Before discussing the embodiments of FIG. 4 in more detail, an apparatus for encoding an information signal having discrete values is described by referencing FIG. 8. An information signal having discrete values can be an audio signal, a video signal, an audio/video signal which is called a multimedia signal, or a signal having measurement values, or any other signal representing a physical quantity, which has to be quantized.

The apparatus for encoding includes the quantizer 502 having a quantization border, wherein the quantizer 502 is adapted so that a discrete value above the quantization border is quantized to a different quantization index than a discrete value below the quantization border. These two quantization indices representing discrete values below, or above the same quantization border are adjacent quantization indices, although one could also use a quantizer having a quantization border separating two quantization indices, which are not adjacent to each other, but are separated by one or more intermediate quantization indices.

The quantizer 502 includes a quantization step size, which is also variable. As will be discussed later on with respect to FIG. 10, the quantization step size can be modified by actually modifying the inner quantization mapping function illustrated for example in FIG. 10. Alternatively, a fixed inner quantizer mapping function can be used and the information signal values input into the quantizer can be pre-multiplied by a scalefactor. When the pre-multiplication uses a scalefactor larger than 1.0, then a smaller quantization step size is obtained when using the amplified discrete values, which result in a smaller quantization noise, while when the scalefactor is lower than 1, a larger quantization step size is effectively implemented increasing the quantization noise.

Naturally, when one starts from a scalefactor of for example 20, decreasing a scalefactor to, for example 15, results in an increased quantization step size which again results in an increased quantization noise and vice versa.

The embodiment illustrated in FIG. 8 furthermore includes a controller for modifying the quantization border. The controller is indicated at reference numeral 506. The controller can furthermore have a functionality for modifying the quantizer step size of the quantizer 502, either by using a premultiplication, or by actually influencing the quantizer mapping function, which will be discussed in connection with FIG. 10.

Particularly, the quantizer 502 has a first quantization border setting which setting is adapted to generate a first set of quantization indices for the discrete values, and wherein the quantizer 502 furthermore has a second modified quantization border setting, so that a second set of quantization indices can be generated for the discrete values.

Figure 6:
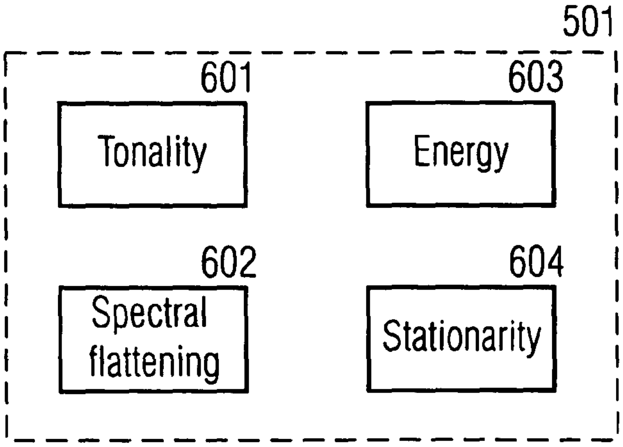
FIG. 6 is an embodiment for the present invention.
Figure 7:
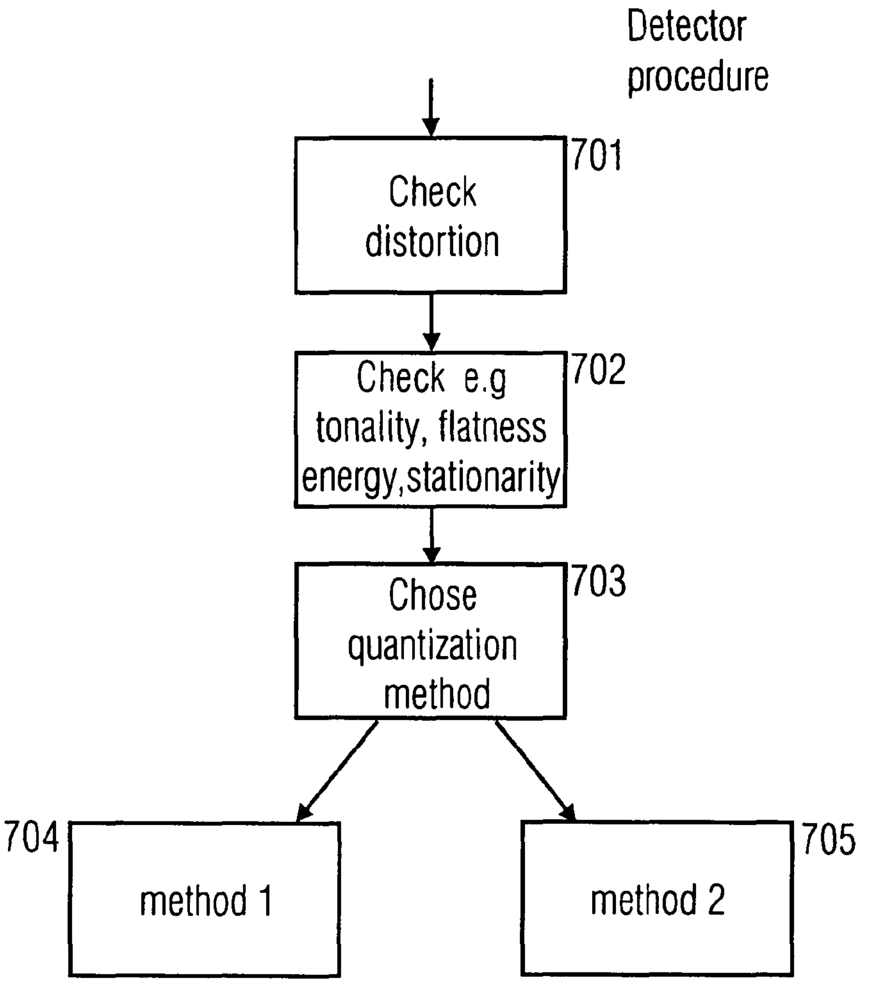
FIG. 7 is the detection process.

This first set of quantization indices is illustrated in FIG. 8 at 509, and the second set of quantization indices is illustrated in FIG. 8 at 510. These sets of quantization indices can for example be introduced into the redundancy reducing encoder implemented, for example, as a Huffman encoder, or an arithmetic encoder. The redundancy encoder 503 is connected to the output interface 501 which is also called a "detector" in FIG. 5, for outputting an encoded information signal 512 based on the first set of quantization indices 509, or the second set of quantization indices 510, wherein the decision which set of quantization indices forms the basis for the encoded information signal 512 is taken using a decision function, which will be discussed in more detail in connection with FIG. 6, 7 or 11.

The redundancy encoder 503 is an optional feature. There can also be situations in which a further redundancy reduction of the sets of quantized values is not necessitated anymore. This can be the case when the bit rate requirements of a transmission channel or the capacity requirements of a storage medium are not so stringent, as in the case in which a redundancy reducing encoder is provided. Due to the fact that the quantization operation per se is a lossy compression operation, a data reduction and, therefore, a bit rate reduction is even obtained without a redundancy encoder 503.

Advantageously, however, the redundancy encoder 503 is provided to obtain a bit rate necessitated by the encoded information signal 512, which is as small as possible.

The redundancy encoder 503 can be implemented as a Huffman encoder relying on fixed code tables for single or multidimensional Huffman encoding, as known from AAC (Advanced Audio Encoding) encoding. Alternatively, the redundancy encoder can also be a device actually calculating the statistic of the information signal. These statistics are used for calculating a real signal-dependent code table, which is transmitted together with the encoded information signal, i.e. the bit sequence representing the first set or the second set. Such a device is, for example, known as WinZip.

Generally, a redundancy encoder which has the exemplary characteristic that the bit demand is smaller for smaller quantization indices is advantageous. Such a redundancy encoder has a code table which has the general characteristic that the smaller the quantization index is, the shorter the code word IS. Such code tables are particularly useful for encoding differentially encoded information signals, since a difference encoding preceding a redundancy encoder normally results in higher probability for small quantization indices, which translate into shorter code words for these quantization indices occurring with a higher probability than higher quantization indices.

FIG. 8 furthermore illustrates that the output interface 501 is operatively connected to the controller 506 via a control connection 514. As will be discussed in connection with FIG. 11, the decision function not only decides on the encoded information signal, but can also control the controller 506, so that this controller modifies the quantization border in an optimum way to additionally optimize the invention quantizer operation.

Figure 9:
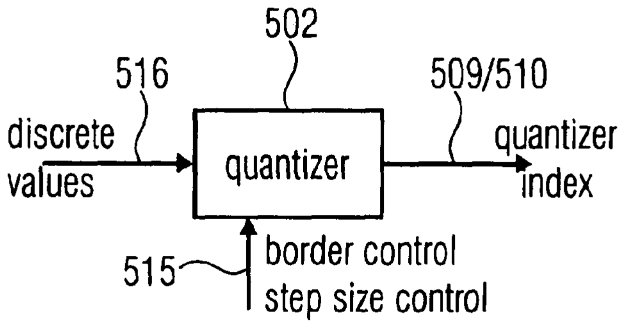
FIG. 9 is a general black box for the quantizer having a variable border and having a variable step size.

FIG. 9 illustrates a schematic view of the quantizer 502 which receives, as an input signal, a discrete value and which outputs a quantizer index, and which receives as control signals, border control signals and optionally step size control signals via control line 515. As outlined in the context of FIG. 5, the discrete value 516 can advantageously be an audio signal, and most advantageously, a discrete value of a spectral representation of a time domain audio signal. Such a spectral representation can be a discrete value of a subband signal, when the filterbank 504 is, for example, a QMF filterbank. Alternatively, the discrete value can be a MDCT value of a MDCT spectrum (MDCT=Modified Discrete Cosine Transform), or can be any other value of a spectral representation such as of a Fourier Spectrum, such as an FFT spectrum, or can be generated by any other time/frequency conversion algorithm.

FIG. 10 illustrates more details of the quantizer 502. Exemplarily, FIG. 10 illustrates a quantizer inner mapping function, mapping a discrete value within a range of 0.0 to 4.0 on one of, for example five different quantization indices 0, 1, 2, 3, 4. In the FIG. 10 inner mapping function, the quantization borders are illustrated at 0.5, 1.5, 2.5, 3.5, i.e. in the middle between two quantizer representative values 0.0, 1.0, 2.0, 3.0 or 4.0. This quantizer border setting results in the lowest mean square error of the quantization operation. However, the inventors have found that modifying the quantization border without transmitting any side information on this kind of modification, can indeed result in an encoded information signal necessitating less bits, or having a smaller quantization noise, or even having less bits and having a smaller quantization noise. However, the case of necessitating more bits compared to the quantization having a coarse quantization step size, but necessitating less bits than having a fine quantizer step size can even be useful for certain situations, in order to enhance the degree of freedom of an inventive information signal encoder.

In the FIG. 10 example, the quantization border is set so that values between 0 and the quantization border of 0.5 result in an output quantization index of 0, while values between 0.5 and 1.5 result in a quantization index of 1. Analogously, values between 1.5 and 2.5 result in a quantization index of 2.

When the quantization border is modified, as e.g. indicated in the figure, i.e. is shifted to higher discrete values, then the result will be that the energy of the set of quantization indices decreases compared to the situation of a non-modified quantization border. This procedure would be particularly useful when a subsequently conducted redundancy-reducing operation exists, which has the characteristics that smaller values result in shorter code words, or generally result in a lower bit demand. When, however, a subsequently performed redundancy encoding operation has the tendency that higher values result in a lower bit demand, then it would be useful to modify the borders in the direction of lower discrete values, i.e. to the left of FIG. 10. Modifying the borders towards smaller or larger values, however, it is also useful even when a redundancy-reducing encoder is not provided, when the additional compression incurred by the redundancy encoder is not necessitated.

Apart from the quantization border which modifies the bit demand and accuracy of the quantizer, the bit demand and the accuracy of the quantizer are also determined by the quantization step size. In the FIG. 10 example, the quantization step size is set to 1.0, i.e. to the difference between a discrete input value at a first quantizer representative value and a discrete input value at a neighboring different quantizer representative value such as the representative values 2.0 and 1.0 of FIG. 10.

Although FIG. 10 illustrates a linear quantization rule, the same teaching can also be applied to non-linear quantization rules, such as logarithmic quantizers which automatically compress higher values and which have the tendency to expand lower values which is behavior adapted to the human hearing capabilities.

The modification of the quantization step size, therefore, also determines the accuracy or the error and also the bit demand, but a modification of the quantization step size is transmitted from an encoder to the decoder, for example, via a scalefactor, while the inventive modification of the quantization border does not necessitate any additional side information to be transmitted from the encoder to the decoder.

For modifying the quantization step size, one could either change the inner mapping function of FIG. 10, or one could perform a pre-multiplication of a discrete input value using a scalefactor. When the scalefactor is larger than 1, the accuracy of the quantizer is increased which means that an effectively reduced quantization step has been applied. When, however, a value is multiplied by a scalefactor smaller than 1, then the accuracy of the quantizer is decreased, which normally means a reduced bit demand. It is to be emphasized, however, that all scalefactors can also be values above 1.0. In this situation, higher scalefactors mean a finer quantization step size and lower scalefactors mean comparatively larger quantizer step sizes for one and the same scalefactor band or spectral coefficient.

A detection algorithm can choose between normal quantization and the modified quantization according to the invention. Usually its decision will be based on the resulting quantization noise in combination with the bits needed. In addition to only looking at the distortion and the bits other parameters may influence the overall quality and thus can be included in the decision process (See FIG. 6). One of these parameters is the resulting energy 603 of the quantized data compared to the original energy of the scalefactor band before quantization. Other criteria that influence the decision for the new quantization method can be e.g. the tonality 601, the spectral flatness 602 or a measure of how stationary the signal is 604.

In the following an example is given, explaining how the new quantization method is added to an existing encoder. At a certain point in the encoding process a scalefactor band as e.g. the band of the FIGS. 1-3 is quantized according to FIG. 2. Because there are no more bits available, using a finer quantization step size as in FIG. 1 is not allowed. Now the quantization method according to the invention can be tried. To get the effect of a modified quantization border as described above, only the inverse quantization is changed to the finer step size of FIG. 1 and the resulting distortion is compared to the result obtained by the normal quantization of FIG. 2. Other modified borders can be tested by even finer step sizes. By using this method, the quantized values are the same, which implicates that the bits needed for entropy coding remain the same for all calculated possibilities. The difference of the various quantization methods lies only in the scalefactor that determines the quantization step size. Since the bit demand is the same in this practical approach, the detector is now able to choose the best solution. If the detection process (see FIG. 7) relies only on quantization distortion 701, this would be the solution of FIG. 3 in this example. If in addition the detection process is influenced by other criteria as e.g. the tonality or a spectral flatness measure 702 the detector may still favor the solution with the normal quantization 704 to the new solution 705 even though the new solution has less distortion.

Figure 11:
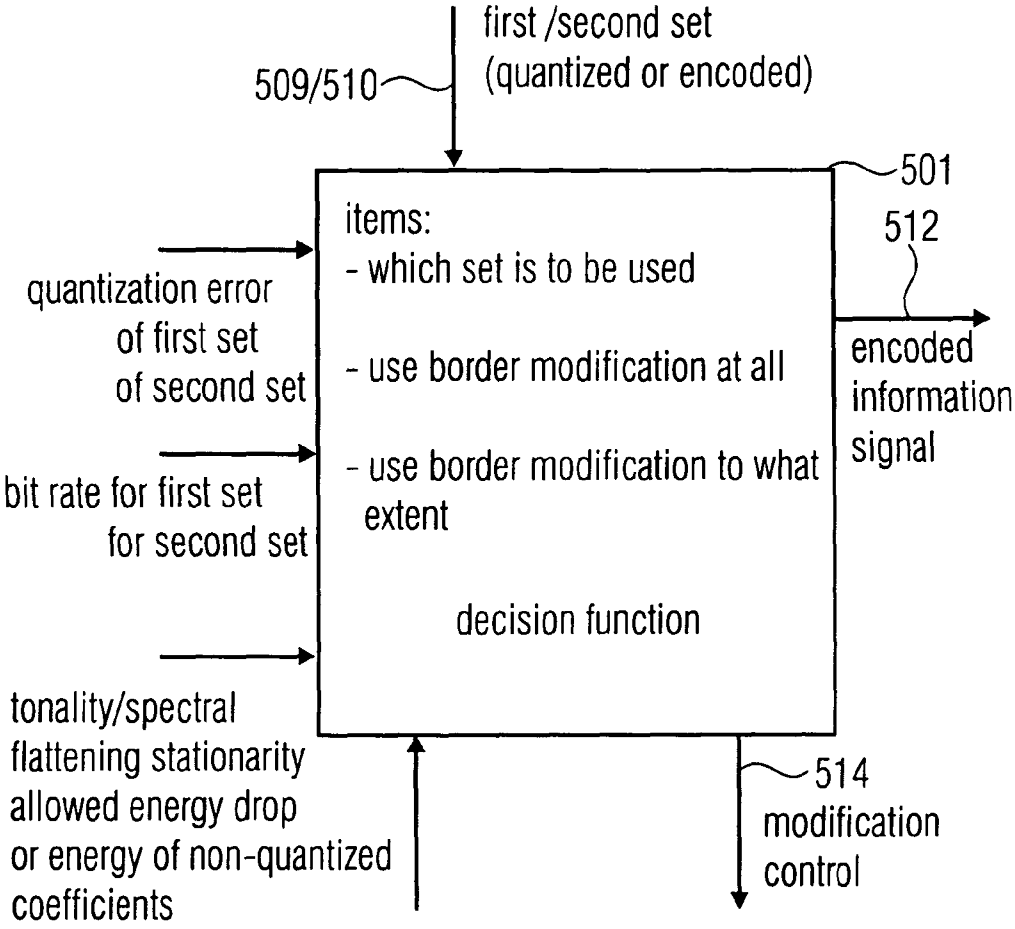
FIG. 11 is embodiments for the decision function implemented by the output interface/detector feature.

FIG. 11 illustrates a more detailed embodiment of the decision function/output interface 501 of FIG. 8. Specifically, the output interface determines one or more decision items. These decision items include a decision on which set is to be used to form the encoded information signal, whether a border modification is to be done at all, or to what extent the border modification is to be used.

Decision function inputs are the quantization error associated with the first set of quantization indices, a quantization error associated with a second set of quantization indices, a necessitated bit rate for the encoded information signal which is based on the first set, or a necessitated bit rate for an encoded information signal which is based on the second set. Further input values may include a tonality of a scalefactor band, a spectral flatness measure of the scalefactor band, a stationarity of the scalefactor band, or for example, a window switching flag indicating transients, i.e., non-tonal signal portions.

Further input variables are an allowed energy drop compared to quantization indices obtained by quantizing a set of spectral coefficients using a quantization border in the middle between two quantizer representation values. Furthermore, an additional energy measure can include the rule that the energy of the first set, or the second set, after re-quantization is not allowed to drop below the energy of the original non-quantized coefficients. To determine whether this energy condition is fulfilled, the output interface 501, or as stated in connection with FIG. 5, the detector 501 may include an inverse quantizer stage.

In one exemplary embodiment, the main requirement is that a quantization error introduced by a set of quantizer indices is so that an introduced distortion is psycho-acoustically masked by the audio signal. A further requirement mainly influencing the selection performed by the decision function is the necessitated bit rate. When it is assumed that the necessitated bit rate is within allowed limits, then the set of quantizer indices is used, which results in the lowest quantization error. If it, however, turns out that an encoding of an audio signal with an allowed bit rate is not possible without violating the psycho-acoustic masking threshold, then a compromise between bit rate and quantization error can be searched, provided that the bit rate requirement is so that some (small) variations of the bit rate are allowed.

Furthermore, a tonality measure, a spectral flatness measure or a stationarity measure can be applied to find out whether modifying a quantization border makes any sense. It has been found out that a modification of a quantization border to higher representative values makes particular sense, when a signal is tonal, but does not make as much sense, when the signal is a noisy audio signal. A spectral flatness measure (SFM) or the stationarity measure generally indicates a tonal nature or an audio signal, or for example, a scalefactor band of an audio signal. A decision, to what extent the border modification can be applied, i.e. how much the border between representative values is increased, can be determined by calculating the energy drop introduced by increasing the quantization border. Generally, increasing the quantization border to higher values results in lower quantization indices, and a set of quantization indices having an energy which is lower than an allowed energy drop might not be useful anymore. A useful measure has been found to be that the energy of the quantized values when re-quantized to discrete spectral values is equal to the energy of the original spectral coefficients within a certain tolerance range. This certain tolerance range is about +/−10% with respect to the energy of the original spectral coefficients in a frequency band having a plurality of such spectral coefficients.

As stated before, the modification of the quantization border in the encoder leads to different quantization values, compared to a "normal" quantizer. The decoder does not need to know whether the quantization border in the encoder has been changed or not. Thus, the inventive encoding scheme does not change the bitstream with respect to generating new side information. The only change in the bitstream, naturally, is incurred due to the fact that the audio signal is represented by a different bit sequence, since some spectral coefficients are quantized to different quantization indices after modification of the quantization border.

There exist several strategies for modifying the quantization border. In one embodiment, the quantization border is increased for all coefficients within a scalefactor band, or even within the whole spectrum simultaneously, but in the discussed example in connection with FIGS. 1, 2 and 3, this only has an effect for one of the four MDCT coefficients. It is not essential that the necessitated number of bits is the same as in the coarse quantizer step sizes. There may also be cases where it is beneficial to obtain a higher signal to noise ratio compared to the coarse normal case of FIG. 1, while less bits are needed compared to the fine normal case of FIG. 2, although more bits as in the coarse case are incurred.

Then, one would have some sort of intermediate alternative between coarse and fine quantization, intermediate in terms of bit rate and SNR which may be beneficial in some cases.

The inventive border modification can also be advantageously used in connection with modification of the step size, so that starting from a coarse quantization, a border and a scalefactor (quantization step size) are changed.

Subsequently, the influence of tonality is discussed. When the tonality of a band or the whole spectrum increases, a modification of the quantization border results more and more in a beneficial output. Stated differently, the more tonal a signal is, the stronger a modification of a border can be.

Changing the modification border towards higher representative values usually results in a decrease in the energy of the decoded output. Thus, measuring this energy during quantization and forbidding an energy decrease below a certain limit is one way to control to what extent the new quantization method can be applied. For example, in the case of a non-tonal signal, the tonality value will be below a certain threshold, and the limit for the energy can be chosen so that it is not allowed to obtain an energy of the decoded output which is lower than the energy of the unquantized original MDCT coefficients.

Spectral flattening and stationarity are just other examples besides the tonality measure which can influence the decision, whether it makes sense to use the new quantization method or not. A detector may also use one, or a combination of several measures out of tonality, spectral flatness and stationarity to decide whether the new method is to be tried in addition to conventional quantization.

Although one could in general use a psycho-acoustically driven encoder using an outer loop and an inner loop, when for example the encoder is defined as in the informative part of the MP3 standard (MPEG 1 layer 3). One can advantageously use the present invention in the situation, where the encoder does not have an inner loop and an outer loop anymore. In this scenario, the inventive approach can be applied in an optimization process, where several different scalefactors/borders are tried and the best combination of bit rate efficiency versus quantization distortion is chosen, which "best combination" being determined by the decision function. Therefore, there can be two possible approaches, one approach is to have a current best solution as in FIG. 1. If one wants to save bits, and if one would violate the masking threshold using the coarse quantization of FIG. 2, one would just try FIG. 3. When the resulting noise of FIG. 3 does not violate the masking threshold, then the solution of FIG. 3 would be the best choice.

In the other approach, the starting point is FIG. 3. It is a valid solution, but by using a smaller scalefactor and the modified border of FIG. 3, one is able to increase the signal to noise ratio without spending more bits compared to FIG. 3. Even if the masking threshold is not violated by the exclusion of FIG. 3, it may be beneficial to further decrease the noise so that this solution would again be favored. In some embodiments, however, the quantization error is checked. On the other hand, the potential savings in bits do not need to be calculated. Often an estimation or even the knowledge that the amount of bits will usually be lowered by modifying the quantization border to higher representative values is sufficient.

The present invention modifies the quantizer for the spectral coefficients of a transform based audio coder in order to exploit the different codeword lengths of the following entropy coder. Compared to normal quantization with this new method sometimes there will be a new solution with less distortion at the same amount of bits needed. A detection algorithm can choose between normal quantization and quantization according to the present invention. Besides the quantization noise, the detection algorithm may use other criteria in addition as e.g. the resulting energy after quantization, the tonality, the flatness of the spectrum or the stationarity of the signal Depending on certain implementation requirements of the inventive methods, the inventive methods can be implemented in hardware or in software. The implementation can be performed using a digital storage medium, in particular a disk, DVD or a CD having electronically readable control signals stored thereon, which cooperate with a programmable computer system such that the inventive methods are performed. Generally, the present invention is, therefore, a computer program product with a program code stored on a machine readable carrier, the program code being operative for performing the inventive methods when the computer program product runs on a computer. In other words, the inventive methods are, therefore, a computer program having a program code for performing at least one of the inventive methods when the computer program runs on a computer.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. Apparatus for encoding an information signal comprising discrete values, comprising:

a quantizer comprising a quantizer step size and a quantization border between two quantizer representative values, a distance between the two quantizer representative values being the quantizer step size, wherein the quantizer is adapted so that a discrete value above the quantization border is quantized to a quantization index, which is different from a quantization index acquired by quantizing a discrete value below the quantization border;

a controller for modifying the quantization border between the two quantizer representative values to acquire a modified quantization border setting, wherein the quantizer comprising a first quantization border setting is adapted to generate a first set of quantization indices for the discrete values, and wherein the quantizer comprising a second modified quantization border setting is adapted to generate a second set of quantization indices, wherein the controller is operative to modify the quantization border so that the second set of quantization indices represents a signal after dequantization comprising an energy being closer to the energy of the original signal by a predetermined deviation threshold;

a redundancy reducing encoder for redundancy encoding the first set of quantization indices or the second set of quantization indices to generate a first encoded representation or a second encoded representation, wherein a smaller quantization index results, with a probability above 0.5 in a code necessitating a smaller number of bits than a higher quantization index; and an output interface for outputting an encoded information signal which is either based on the first set of quantization indices or the second set of quantization indices dependent on a decision function, the output interface being operative to use a number of bits necessitated by the first encoded representation or the second encoded representation in the decision function.

2. Apparatus in accordance with claim 1, wherein the output interface is operative to use a quantization error depending on a difference between a value after re-quantization and a value before quantization in the decision function.

3. Apparatus in accordance with claim 1, in which the redundancy reducing encoder is a variable length codeword encoder, or is an arithmetic encoder.

4. Apparatus in accordance with claim 3, in which the variable length codeword encoder is a Huffman encoder comprising a set of predetermined codebooks or being adapted to generate an information specific codebook which is output by the output interface.

5. Apparatus in accordance with claim 1, further comprising a time/frequency converter for generating a frequency representation of a block of time domain input samples, the frequency representation comprising the information signal comprising discrete values.

6. Apparatus in accordance with claim 5, in which the time/frequency converter comprises a windower for windowing a block of time domain samples and a transformer using a cosine transform, a sine transform a modified cosine transform, a modified sine transform or a complex Fourier transform to generate the set of spectral coefficients, the information signal depending on the set of spectral coefficients.

7. Apparatus in accordance with claim 6, in which the set of spectral coefficients is grouped in a plurality of scalefactor bands, a scalefactor band comprising an associated scalefactor for weighting the spectral coefficients in the scalefactor band before quantizing weighted spectral coefficients, and wherein the modifier is operative to selectively modify the quantization border per scalefactor band.

8. Apparatus in accordance with claim 1, in which the first quantization index above the quantization border is higher than a second quantization index below the quantization border, in which the modifier is operative to increase the quantization border with respect to a position in the middle between a first discrete value representative for the first quantization index and a second discrete value representative for the second quantization index.

9. Apparatus in accordance with claim 1, in which the quantization index is a magnitude and a sign associated with the quantization index is treated separately.

10. Apparatus in accordance with claim 1, in which the modifier is operative to modify the quantization border by a predetermined increment or dependent on the information signals so that the first set of quantization indices is different from the second set of quantization indices.

11. Apparatus in accordance with claim 1, in which the modifier is additionally operative to modify the quantization step size by pre-multiplying the set of discrete values using a scalefactor and using a fixed difference between a first representative for the first quantization index and a second representative for the second quantization index, or by modifying the difference between a first representative for the first quantization index and the second representative for the second quantization index.

12. Apparatus in accordance with claim 1, in which the output interface is operative to calculate a result of the decision function, the decision function depending on a bit demand for the encoded information signal, a quantization noise associated with the first set or the second set of quantization indices, or a distance of the quantization noise to an allowed noise which is allowed to be introduced into the information signal by the quantizer.

13. Apparatus in accordance with claim 1, in which the information signal is an audio signal, and in which the output interface is operative to calculate the result of the decision function based on an energy of the information signal or the first or the second set of quantization values, a tonality, a spectral flatness, or a stationarity of the information signal.

14. Apparatus in accordance with claim 1, in which the deviation threshold is signal dependent and increases when the tonality increases, when the spectral flatness decreases or when the stationarity increases.

15. Apparatus in accordance with claim 1, in which the output interface is operative to use the decision function, the decision function being influenced by a difference between an actually introduced quantization noise and an allowed quantization noise more than by an increase in the bit rate.

16. Method of encoding an information signal comprising discrete values, using a quantizer comprising a quantizer step size and a quantization border between two quantizer representative values, a distance between the two quantizer representative values being the quantizer step size, wherein the quantizer is adapted so that a discrete value above the quantization border is quantized to a quantization index, which is different from a quantization index acquired by quantizing a discrete value below the quantization border, comprising:

modifying the quantization border between the two quantizer representative values to acquire a modified quantization border setting;

generating, using the quantizer comprising a first quantization border setting, a first set of quantization indices for the discrete values, or, using the quantizer comprising a second modified quantization border setting, a second set of quantization indices, wherein the quantization border is modified so that the second set of quantization indices represents a signal after dequantization comprising an energy being closer to the energy of the original signal by a predetermined deviation threshold;

redundancy encoding the first set of quantization indices or the second set of quantization indices to generate a first encoded representation or a second encoded representation, wherein a smaller quantization index results, with a probability above 0.5 in a code necessitating a smaller number of bits than a higher quantization index;

deciding, using a decision function, whether an encoded information signal is either based on the first set of quantization indices or the second set of quantization indices, where a number of bits necessitated by the first encoded representation or the second encoded representation is used in the decision function; and outputting the encoded information signal.

17. Non-transitory storage medium having stored thereon a computer program for performing, when running on a computer, a method of encoding an information signal comprising discrete values, using a quantizer comprising a quantizer step size and a quantization border between two quantizer representative values, a distance between the two quantizer representative values being the quantizer step size, wherein the quantizer is adapted so that a discrete value above the quantization border is quantized to a quantization index, which is different from a quantization index acquired by quantizing a discrete value below the quantization border, comprising:

modifying the quantization border between the two quantizer representative values to acquire a modified quantization border setting;

generating, using the quantizer comprising a first quantization border setting, a first set of quantization indices for the discrete values, or, using the quantizer comprising a second modified quantization border setting, a second set of quantization indices, wherein the quantization border is modified so that the second set of quantization indices represents a signal after dequantization comprising an energy being closer to the energy of the original signal by a predetermined deviation threshold;

redundancy encoding the first set of quantization indices or the second set of quantization indices to generate a first encoded representation or a second encoded representation, wherein a smaller quantization index results, with a probability above 0.5 in a code necessitating a smaller number of bits than a higher quantization index;

deciding, using a decision function, whether an encoded information signal is either based on the first set of quantization indices or the second set of quantization indices, where a number of bits necessitated by the first encoded representation or the second encoded representation is used in the decision function; and outputting the encoded information signal.

* * * * *